US012802179B2

(12) United States Patent
Jung et al.

(10) Patent No.: US 12,802,179 B2
(45) **Date of Patent: *Nov. 17, 2026**

(54) NOISE REMOVAL FOR SURVEILLANCE CAMERA IMAGE BY MEANS OF AI-BASED OBJECT RECOGNITION

(71) Applicant: HANWHA VISION CO., LTD., Seongnam-si (KR)

(72) Inventors: Youngje Jung, Seongnam-si (KR); Chansoo Oh, Seongnam-si (KR); Eunjeong Kim, Seongnam-si (KR); Sangwon Lee, Seongnam-si (KR); Seungin Noh, Seongnam-si (KR); Jeongeun Lim, Seongnam-si (KR); Eunji Choi, Seongnam-si (KR); Kibum Park, Seongnam-si (KR); Jaewoon Byun, Seongnam-si (KR); Sangwook Lee, Seongnam-si (KR); Seongha Jeon, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/218,436

(22) Filed: May 26, 2025

(65) Prior Publication Data

US 2025/0285239 A1 Sep. 11, 2025

Related U.S. Application Data

(63) Continuation of application No. 18/381,825, filed on Oct. 19, 2023, now Pat. No. 12,347,077, which is a (Continued)

(30) Foreign Application Priority Data

Apr. 19, 2021 (KR) ........................ 10-2021-0050554

(51) Int. Cl.
*G06T 5/70* (2024.01)
*G06T 5/60* (2024.01)
(Continued)

(52) U.S. Cl.
CPC .................. *G06T 5/70* (2024.01); *G06T 5/60* (2024.01); *G06T 7/11* (2017.01); *G06T 7/20* (2013.01);
(Continued)

(58) Field of Classification Search
CPC ..... G06T 5/60; G06T 5/70; G06T 7/11; G06T 7/20; G06T 2207/20081;
(Continued)

(56) References Cited

U.S. PATENT DOCUMENTS 7,450,757 B2 * 11/2008 Kato ......................... G06T 5/40 382/172
7,702,174 B2 * 4/2010 Kato ......................... G06T 5/40 382/172

(Continued)

FOREIGN PATENT DOCUMENTS

JP 2007-181088 A 7/2007
KR 10-2020-0060868 A 6/2020

OTHER PUBLICATIONS

Swedish Office Action issued on Feb. 9, 2026 for Swdish Patent Application 2351198-3.

*Primary Examiner* — Michael B. Pierorazio
(74) *Attorney, Agent, or Firm* — McLean IP Global; Jason Y. Pahng

(57) ABSTRACT

Disclosed is a device for processing a camera image. The device for processing the camera image is configured to linearly control a noise removal intensity in accordance with a sensor gain amplification in an image obtained by an image capturer in a low luminance environment, and, when an (Continued)

object in the image is recognized, reduce the noise removal intensity in accordance with the speed of movement of the object, and thus, maintain a noise removal intensity having minimized motion blur.

20 Claims, 9 Drawing Sheets

Related U.S. Application Data continuation of application No. PCT/KR2021/010991, filed on Aug. 19, 2021.

(51) Int. Cl.
*G06T 7/11* (2017.01)
*G06T 7/20* (2017.01)
*G06V 10/60* (2022.01)

(52) U.S. Cl.
CPC .... *G06V 10/60* (2022.01); *G06T 2207/20084* (2013.01); *G06V 2201/07* (2022.01)

(58) Field of Classification Search
CPC ........... G06T 2207/20084; G06T 2207/20201; G06V 10/60; G06V 10/82; G06V 2201/07
See application file for complete search history.

(56) References Cited

U.S. PATENT DOCUMENTS 8,031,961 B2 * 10/2011 Nachlieli .................. G06T 5/73 382/254
8,121,193 B2 * 2/2012 Nakagomi ........... H04N 19/192 375/240.27
8,265,387 B2 * 9/2012 Monga ................. H04N 1/6069 358/518
2005/0232483 A1 * 10/2005 Kato ......................... G06T 5/40 382/190
2007/0019729 A1 * 1/2007 Nakagomi ........... H04N 19/176 375/E7.176
2007/0053588 A1 * 3/2007 Chen ...................... G06V 10/30 382/170
2007/0248166 A1 * 10/2007 Chen ...................... H04N 19/44 375/E7.193
2007/0285511 A1 * 12/2007 Shafer ................ G08B 21/0476 340/541
2009/0021644 A1 * 1/2009 Peng ........................ H04N 5/21 348/607
2009/0033773 A1 * 2/2009 Kinoshita ............. G06T 3/4023 348/241
2009/0041351 A1 * 2/2009 Kato ......................... G06T 5/40 382/171
2009/0290067 A1 * 11/2009 Ishiga ....................... G06T 5/50 348/607
2010/0026896 A1 * 2/2010 Yamauchi ................ H04N 5/21 348/607
2010/0045870 A1 * 2/2010 Chao ........................ H04N 5/21 348/607
2010/0091194 A1 * 4/2010 Lei ............................ G06T 5/20 382/167
2010/0177936 A1 * 7/2010 Ebling ................... G06V 20/53 348/148
2010/0265402 A1 * 10/2010 Van Heesch ............. H04N 5/21 348/607
2010/0265404 A1 * 10/2010 McCarthy ................. G06T 5/70 348/E5.078
2010/0329361 A1 * 12/2010 Choi .................... H04N 19/176 375/E7.193
2011/0019093 A1 * 1/2011 Zhong ....................... G06T 5/70 348/607
2011/0235941 A1 * 9/2011 Hamada ................. H04N 5/213 382/275
2012/0081612 A1 * 4/2012 Segall ....................... G06T 5/70 348/607
2012/0114035 A1 * 5/2012 Nakagomi ............. H04N 19/11 375/240.03

* cited by examiner

FIG. 13A
FIG. 13B
Hanwha Techwin
Hanwha Techwin

NOISE REMOVAL FOR SURVEILLANCE CAMERA IMAGE BY MEANS OF AI-BASED OBJECT RECOGNITION

CROSS REFERENCE TO RELATED APPLICATION

This application is a continuation of U.S. application Ser. No. 18/381,825, filed on Oct. 19, 2023, which is a continuation application of International Application No. PCT/KR2021/010991, filed on Aug. 19, 2021, which is hereby incorporated by reference in its entirety. In addition, this application claims priority from and the benefit of Korean Patent Application No. 10-2021-0050554, filed on Apr. 19, 2021, in the Korean Intellectual Property Office, the disclosure of which is hereby incorporated by reference for all purposes as if fully set forth herein.

BACKGROUND

1. Field

The present disclosure relates to a device and method for processing a surveillance camera image.

2. Description of Related Art

When capturing an image by a surveillance camera in a low-illumination environment, it is necessary to forcibly set a sensor gain to a high value to brighten a dark screen. At this time, noise occurs in the image. To remove the noise, two-dimensional (2D) digital noise reduction (DNR) and three-dimensional (3D) DNR methods are used in an appropriate combination.

The 2D DNR is a method of correcting a noise pixel by referring to the surrounding pixels of the noise pixel, which is effective in removing noise from moving objects, but when removing noise from stationary objects, such as a background, resolution decreases such as blurring. The 3D DNR is a method of correcting a noise pixel by referring to the pixels of the front and back frames at the same location.

In the case of surveillance cameras, noise occurring due to sensor gain amplification in low-illumination environments is removed using 2D and 3D noise filters, which are existing noise removal technologies. Since noise is reduced with a predefined removal intensity regardless of the presence or absence of an object, the object inevitably becomes blurred and a lot of motion blur occurs. If the noise removal intensity is decrease to reduce an afterimage effect (motion blur), noise inevitably increases, which increases an amount of image transmission information required a high bandwidth. Therefore, existing noise removal technology controls noise to a certain level regardless of the presence or absence of an object on the screen, even if the object shows motion blur. Accordingly, if there is a lot of movement of the object, motion blur increases and it may be difficult to identify the object.

Therefore, a method of minimizing a blur effect, while increasing a recognition rate for people and objects that are main surveillance targets.

SUMMARY

In order to address the above-mentioned problem, a method of controlling to remove a lot of noise when there is no motion using motion information about an object, and removing less noise when there is a motion may be considered, but there may be functional limitations due to error problems of motion alarms that occur in the natural environment. Accordingly, the present disclosure may provide a device, method, and system for dynamically controlling noise removal intensity to minimize motion alarm errors resulting from reliance on motion data of the related art and minimize motion blur of an object, while increasing a recognition rate of the object by accurately recognizing motion information about the object, by applying artificial intelligence (AI) technology to the field of image processing of surveillance cameras.

The present disclosure provides a device and method for processing a surveillance camera image capable of minimizing motion blur by dynamically controlling a noise removal intensity depending on the presence or absence of objects on a screen.

The present disclosure also provides a device and method for processing a surveillance camera image capable of minimizing motion blur and noise depending on whether objects on a screen move in low-illumination conditions.

The technical problems to be solved by the present disclosure are not limited to the technical problems mentioned above, and other technical problems not mentioned may be clear to those skilled in the art from the detailed description below.

In an aspect, a device for processing a surveillance camera image may include: an image capturer; and a processor configured to linearly control a first noise removal intensity according to an amount of sensor gain amplification in an image acquired through the image capturer in a low-illumination environment, wherein, when an object is recognized in the image, the processor dynamically controls a noise removal intensity between the first noise removal intensity and a second noise removal intensity lower than the first noise removal intensity according to a moving speed of the object.

When the processor does not recognize the object in the image, the processor may linearly decrease a shutter speed of the image capturer from a first shutter speed as a section of the low-light environment is to a second shutter speed as the amount of sensor gain amplification increases to reach a first sensor gain value, and when the processor recognizes the object, the processor may set the amount of sensor gain amplification reaching the second shutter speed to a second sensor gain value greater than the first sensor gain value.

The processor may recognize the object by applying a deep learning-based You Only Look Once (YOLO) algorithm, assigns an identifier (ID) to each recognized object, extracts coordinates of the object, and calculate a moving speed of the object based on the coordinate information about the object included in a first image frame and a second image frame having a lower priority than the first image frame.

The first noise removal intensity may be a noise removal intensity when the object does not exist in the image, and the second noise removal intensity may have a rate of reduction in the first noise removal intensity that varies depending on the moving speed of the object.

When the moving speed of the object increases and reaches a maximum limit speed recognizable by the image capturer, the processor may control the noise removal intensity at a maximum reduction rate based on the first noise removal intensity.

The processor linearly increases the second noise removal intensity when the amount of sensor gain amplification increases and reaches a first gain value, and control to remove noise at the same intensity as the first noise removal intensity when the amount of sensor gain amplification exceeds the first gain value and reaches a second gain value.

The first gain value may be 42 dB, and the second gain value may be 60 dB.

When an object is recognized in the image, the processor may reduce a control intensity of each filter for two-dimensional (2D) digital noise reduction (DNR) and three-dimensional (3D) DNR at a predetermined rate according to the moving speed.

The processor may divide the image acquired from the image capturer into a first region in which no movement of the object occurs and a second region in which the movement occurs, and apply the first noise removal intensity to the first region and apply the second noise removal intensity to the second region.

When movement of the object is detected or when the moving speed of the object increases, the processor may immediately reduce the noise removal intensity according to a predetermined reduction ratio from a current noise control strength.

When the detected movement of the object disappears or when the moving speed of the object decreases, the processor may linearly increase the noise removal intensity by reflecting the moving speed of the object after the lapse of a predetermined pause time.

The device may further include a communication unit, wherein the processor transmits image data acquired through the image capturer to an external server through the communication unit, and receives artificial intelligence-based object recognition results from the external server through the communication unit.

In another aspect, a device for processing a surveillance camera image includes: an image capturer; and a processor configured to linearly control a noise removal intensity according to an amount of sensor gain amplification in an image acquired through the image capturer in a low-illumination environment and dynamically control the noise removal intensity according to a moving speed of an object recognized in the image, wherein the processor sets the image acquired from the image capturer as input data, sets object recognition as output data, and recognizes the object by applying a previously trained neural network model.

The processor may dynamically control the noise removal intensity according to the moving speed of the object between a first noise removal intensity and a second noise removal intensity, the first noise removal intensity may correspond to a case where the object or movement of the object is not detected in the image, and the second noise removal intensity may correspond to a noise removal intensity reduced by a maximum reduction rate based on the first noise removal intensity when the moving speed of the object increases to reach a maximum limit speed recognizable by the image capturer.

In another aspect, a method for processing a surveillance camera image includes: linearly controlling a first noise removal intensity according to an amount of sensor gain amplification in an image acquired through an image capturer; when an object is recognized in the image, calculating a moving speed of the object; and dynamically controlling a noise removal intensity between the first noise removal intensity and a second noise removal intensity lower than the first noise removal intensity according to the moving speed.

When the object is not recognized in the image, a shutter speed of the image capturer may be decreased from a first shutter speed as a section of the low-light environment starts to a second shutter speed as the amount of sensor gain amplification increases to reach a first sensor gain value, and when the object is recognized, the amount of sensor gain amplification reaching the second shutter speed may be set to a second sensor gain value greater than the first sensor gain value.

The method may further include: recognizing the object by applying a deep learning-based YOLO algorithm; and assigning an ID to each recognized object, extracting coordinates of the object, and calculating a moving speed of the object based on the coordinate information about the object included in a first image frame and a second image frame having a lower priority than the first image frame.

The first noise removal intensity may be a noise removal intensity when the object does not exist in the image, and the second noise removal intensity may have a rate of reduction in the first noise removal intensity that is controlled to vary depending on the moving speed of the object.

When the moving speed of the object increases and reaches a maximum limit speed recognizable by the image capturer, the noise removal intensity may be controlled at a maximum reduction rate based on the first noise removal intensity.

When the amount of sensor gain amplification increases and reaches a first gain value, the second noise removal intensity may be linearly increased, and when the amount of sensor gain amplification exceeds the first gain value and reaches a second gain value, noise may be controlled to be removed at the same intensity as the first noise removal intensity.

When the detected movement of the object disappears or when the moving speed of the object decreases, the noise removal intensity may be linearly increased by reflecting the moving speed of the object after the lapse of a predetermined pause time.

In another aspect, a surveillance camera includes: a surveillance camera configured to capture an image of a surveillance region in an environment of a predetermined illumination or lower; and a computing device configured to receive the captured image from the surveillance camera through a communication unit, recognize an object in the image through an artificial intelligence-based object recognition algorithm, calculate a moving speed of the recognized object, and transmit the calculated moving speed to the surveillance camera, wherein the surveillance camera dynamically controls noise removal intensity between a first noise removal intensity and a second noise removal intensity lower than the first noise removal intensity according to the moving speed of the object.

In another aspect, a method for processing a surveillance camera image includes: recognizing an object in an image acquired through an image capturer; calculating a moving speed of the object; and dynamically controlling noise removal intensity of the image between a first noise removal intensity and a second noise removal intensity according to the moving speed of the object, wherein the first noise removal intensity corresponds to a case where the object or movement of the object is not detected in the image, and the second noise removal intensity corresponds to a noise removal intensity reduced by 40% reduction rate based on the first noise removal intensity when the moving speed of the object increases to reach a maximum limit speed recognizable by the image capturer.

According to the present disclosure, by more accurately recognizing motion information about an object, the noise removal intensity may be dynamically controlled to increase the recognition rate of the object and at the same time minimize motion blur of the object.

In addition, the present disclosure may minimize motion blur and noise depending on whether an object on the screen moves in low-illumination conditions.

The effects that may be obtained from the present disclosure are not limited to the effects mentioned above, and other effects not mentioned may be clearly understood by those skilled in the art from the description below.

BRIEF DESCRIPTION OF DRAWINGS

The accompanying drawings, which are included as part of the detailed description to help understanding of the present disclosure, provide examples of the present disclosure and, along with the detailed description, and describe technical features of the present disclosure.

Figure 1:
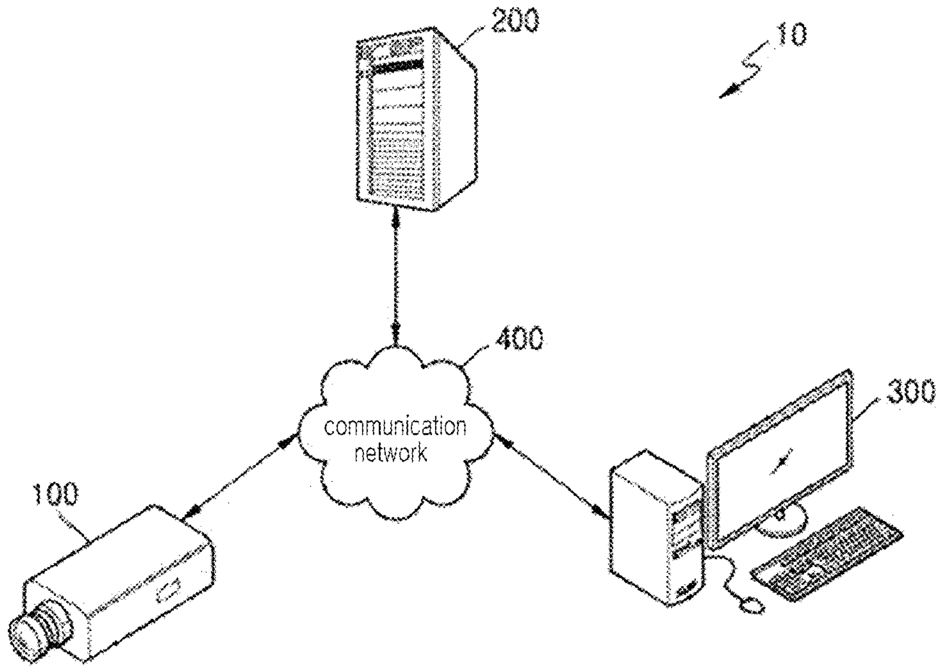
FIG. 1 is a diagram illustrating a surveillance camera system for implementing a processing method of a surveillance camera image according to the present disclosure.

The accompanying drawings, which are included as part of the detailed description to help understanding of the present disclosure, provide examples of the present disclosure and describe technical features of the present disclosure along with the detailed description.

DETAILED DESCRIPTIONS

Hereinafter, the disclosure will be described in detail with reference to the attached drawings. The same or similar components are given the same reference numbers and redundant description thereof is omitted. The suffixes "module" and "unit" of elements herein are used for convenience of description and thus may be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of the disclosure and do not limit technical spirits of the disclosure, and the examples should be construed as including all modifications, equivalents, and alternatives falling within the spirit and scope of the present disclosure.

While terms, such as "first", "second", etc., may be used to describe various components, such components should not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

The present disclosure described above may be implemented as a computer-readable code in a medium in which a program is recorded. The computer-readable medium includes any type of recording device in which data that may be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present disclosure should be determined by reasonable interpretations of the attached claims and every modification within the equivalent range are included in the scope of the present disclosure.

Automatic exposure (AE) control technology is a technology that maintains image brightness of cameras constant, and refers to a technology of controlling brightness using a shutter speed/iris in the case of high brightness (bright outdoor illumination) and correcting brightness of images by amplifying a gain of an image sensor in low illumination (dark illumination) conditions.

Also, the shutter speed refers to a time for a camera to be exposed to light. When the shutter speed is low (1/30 sec), an exposure time is long and an image is brighter, but there is a problem in that motion blur occurs because the movement of objects accumulates during the exposure time. Conversely, when the shutter speed is high (1/200 second or more), the camera exposure time is short and an image may be dark, but the accumulation of the movement of objects is also shortened, which reduces motion blur.

Since surveillance cameras should monitor people and objects, which are the main surveillance targets, without motion blur, it is advantageous to maintain a high-speed shutter. However, when the shutter speed is high, images becomes dark due to a short exposure time, and in low illumination, a gain amplification of the image sensor should be increased to correct the brightness, which may cause relatively more noise. In general, as the gain amplification of an image sensor increases, noise on the screen also increases. Ultimately, using a high shutter speed in low-illumination conditions may reduce motion blur, but may cause increased noise on the screen.

Meanwhile, in a surveillance region imaged by actual surveillance cameras, there are not always objects to be monitored, but it is necessary to be able to monitor randomly occurring objects at any time without motion blur, and thus, a high-speed shutter needs to be inevitably maintained. Maintaining the high-speed shutter causes a lot of noise in low-illumination conditions, so it may also cause many side effects due to noise. For example, as noise increases, the amount of compressed and transmitted image data may increase to increase an image transmission bandwidth and the outline of objects may be blurred due to noise.

In a processing method of a surveillance camera image according to the present disclosure, a shutter speed needs to be automatically controlled depending on the presence or absence of an object on the screen to meet the purpose of the surveillance camera. However, in the related art, motion information was widely used to determine whether an object exists, but there was a problem in that a false alarm frequently occurred due to the natural environment (wind, shaking leaves, etc.). Accordingly, in the present disclosure, objects are recognized through AI image analysis, an ID is assigned to each object, and an average movement speed for the objects to which IDs have been assigned is calculated. The calculated average movement speed of the objects may be used to calculate an appropriate shutter speed that does not cause motion blur.

Meanwhile, in general, under high brightness (outdoor or bright illumination conditions) conditions, motion blur of objects rarely occurs because brightness is corrected using a high-speed shutter. Therefore, the processing method of a surveillance camera image according to the present disclosure may be applied to control a shutter under low illumination conditions in which an image sensor gain is inevitably amplified due to the use of a high speed shutter, and thus, noise increases as the image sensor gain is amplified.

FIG. 1 is a diagram illustrating a surveillance camera system for implementing a processing method of a surveillance camera image according to the present disclosure.

Referring to FIG. 1, an image management system 10 according to the present disclosure may include an image capturer 100 and an image management server 200. The image capturer 100 may be an electronic imaging device disposed at a fixed location in a specific place, may be an electronic imaging device that may be moved automatically or manually along a predetermined path, or may be an electronic imaging device that may be moved by a person or a robot. The image capturer 100 may be an IP (Internet protocol) camera connected to the wired/wireless Internet and used. The image capturer 100 may be a PTZ (pan-tilt-zoom) camera having pan, tilt, and zoom functions. The image capturer 100 may have a function of recording a monitored area or taking a picture. The image capturer 100 may have a function of recording a sound generated in a monitored area. When a change, such as movement or sound occurs in the monitored area, the image capturer 100 may have a function of generating a notification or recording or photographing. The image capturer 100 may receive and store the trained object recognition learning model from the image management server 200. Accordingly, the image capturer 100 may perform an object recognition operation using the object recognition learning model.

The image management server 200 may be a device that receives and stores an image as it is captured by the image capturer 100 and/or an image obtained by editing the image. The image management server 200 may analyze the received image to correspond to the purpose. For example, the image management server 200 may detect an object in the image using an object detection algorithm. An AI-based algorithm may be applied to the object detection algorithm, and an object may be detected by applying a pre-trained artificial neural network model.

Meanwhile, the image management server 200 may store various learning models suitable for the purpose of image analysis. In addition to the aforementioned learning model for object detection, a model capable of acquiring object characteristic information that allows the detected object to be utilized may be stored. The image management server 200 may perform an operation of training the learning model for object recognition described above.

In addition, the image management server 200 may analyze the received image to generate metadata and index information for the corresponding metadata. The image management server 200 may analyze image information and/or sound information included in the received image together or separately to generate metadata and index information for the metadata.

The image management system 10 may further include an external device 300 capable of performing wired/wireless communication with the image capturer 100 and/or the image management server 200.

The external device 300 may transmit an information provision request signal for requesting to provide all or part of an image to the image management server 200. The external device 300 may transmit an information provision request signal to the image management server 200 to request whether or not an object exists as the image analysis result. In addition, the external device 300 may transmit, to the image management server 200, metadata obtained by analyzing an image and/or an information provision request signal for requesting index information for the metadata.

The image management system 10 may further include a communication network 400 that is a wired/wireless communication path between the image capturer 100, the image management server 200, and/or the external device 300. The communication network 400 may include, for example, a wired network, such as LANs (Local Area Networks), WANs (Wide Area Networks), MANs (Metropolitan Area Networks), ISDNs (Integrated Service Digital Networks), and a wireless network, such as wireless LANs, CDMA, Bluetooth, and satellite communication, but the scope of the present disclosure is not limited thereto.

Figure 2:
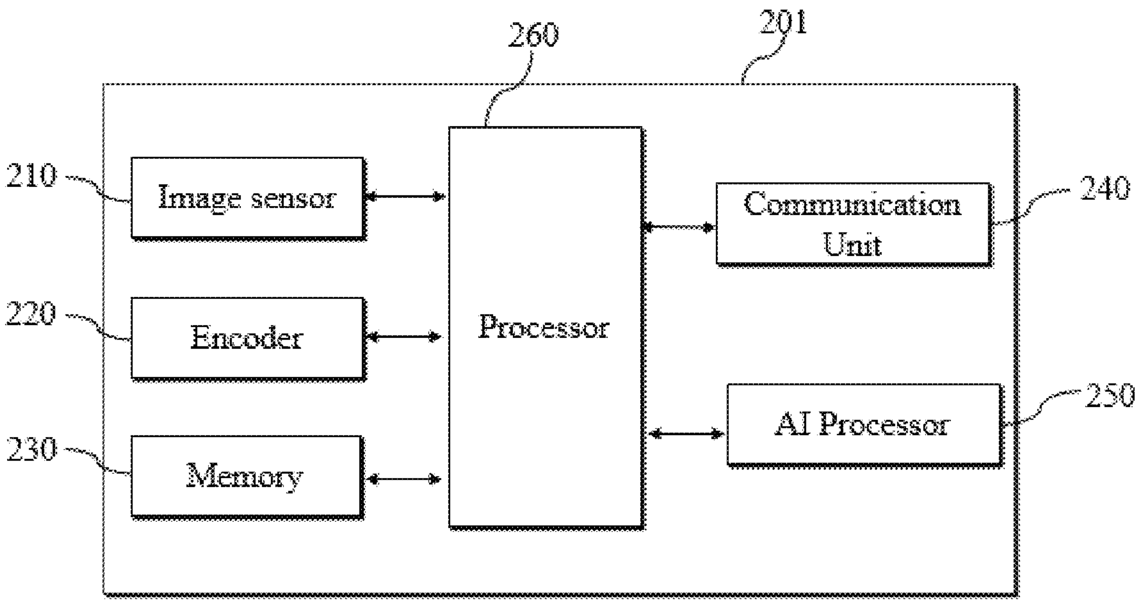
FIG. 2 is a schematic block diagram of a surveillance camera according to the present disclosure.

FIG. 2 is a block diagram illustrating a configuration of the surveillance camera shown in FIG. 1.

Figure 3:
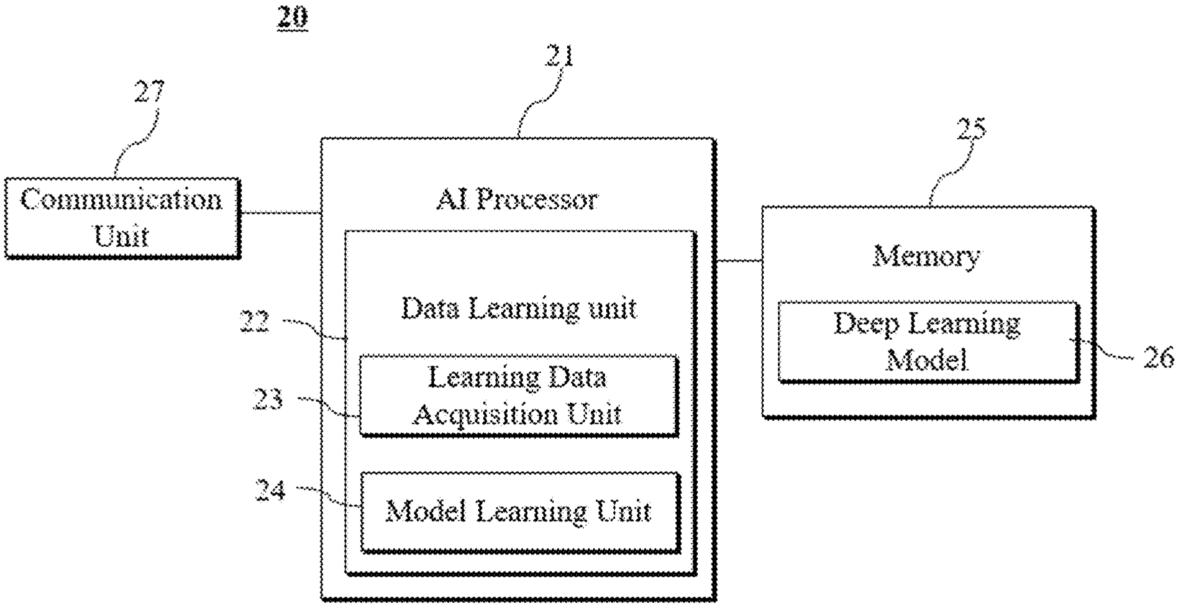
FIG. 3 is a diagram illustrating an AI device (module) applied to analysis of surveillance camera images according to the present disclosure.

Referring to FIG. 3, as an example, a camera 201 is a network camera that performs an intelligent image analysis function and generates a signal of the image analysis, but the operation of the network surveillance camera system according to the present disclosure is not limited thereto. The camera 201 may be or correspond to the image capturer 100 shown in FIG. 1, and may be implemented as a surveillance camera. However, the camera 201 may also be implemented as a general camera or a camera unit included in other types of computing device such as a smartphone, laptop computer, a tablet computer, etc.

The camera 201 includes an image sensor 210, an encoder 220, a memory 230, a communication unit 240, an AI processor 250, a processor 260.

The image sensor 210 performs a function of acquiring an image by photographing a surveillance region, and may be implemented with, for example, a CCD (Charge-Coupled Device) sensor, a CMOS (Complementary Metal-Oxide-Semiconductor) sensor, and the like.

The encoder 220 performs an operation of encoding the image acquired through the image sensor 210 into a digital signal, based on, for example, H.264, H.265, MPEG (Moving Picture Experts Group), M-JPEG (Motion Joint Photographic Experts Group) standards or the like.

The memory 230 may store image data, audio data, still images, metadata, and the like. As mentioned above, the metadata may be text-based data including object detection information (movement, sound, intrusion into a designated area, etc.) and object identification information (person, car, face, hat, clothes, etc.) photographed in the surveillance region, and a detected location information (coordinates, size, etc.).

In addition, the still image is generated together with the text-based metadata and stored in the memory 230, and may be generated by capturing image information for a specific analysis region among the image analysis information. For example, the still image may be implemented as a JPEG image file.

For example, the still image may be generated by cropping a specific region of the image data determined to be an identifiable object among the image data of the surveillance region detected for a specific region and a specific period, and may be transmitted in real time together with the text-based metadata.

The communication unit 240 transmits the image data, audio data, still image, and/or metadata to an image receiving/searching device, which may be or correspond to the external device 300 of FIG. 1. The communication unit 240 may transmit image data, audio data, still images, and/or metadata to the image receiving/searching device in real time. The communication unit 240 may perform at least one communication function among wired and wireless LAN (Local Area Network), Wi-Fi, ZigBee, Bluetooth, and Near Field Communication.

The communication unit 240 may include any one or any combination of a digital modem, a radio frequency (RF) modem, an antenna circuit, a WiFi chip, and related software and/or firmware.

The AI processor 250 is designed for an artificial intelligence (AI) image processing and applies a deep learning based object detection algorithm which is learned in the image acquired through the surveillance camera system according to the present disclosure. The AI processor 250 may be implemented as an integral module with the processor 260 that controls the overall system or an independent module. The present disclosure may apply a YOLO (You Only Lock Once) algorithm in object detection. YOLO is an AI algorithm suitable for surveillance cameras that process real-time video due to a fast object detection speed thereof. Unlike other object-based algorithms (faster R-CNN, R_FCN, FPN-FRCN, etc.), the YOLO algorithm, after resizing one input image, outputs a bounding box indicating a location of each object and a classification probability of what is an object as a result of passing through a single neural network only once. Finally, one object is detected once through non-max suppression.

Meanwhile, it should be noted that the object recognition algorithm disclosed in the present disclosure is not limited to the aforementioned YOLO and may be implemented with various deep learning algorithms.

Meanwhile, a learning model for object recognition applied to the present disclosure may be a model trained by defining camera performance, movement speed information about objects that may be recognized without motion blur in a surveillance camera, etc. as learning data. Accordingly, the trained model may have input data which is a movement speed of an object and a shutter speed optimized for the movement speed of the object as output data.

FIG. 3 is a diagram illustrating an AI (artificial intelligence) device (module) applied to training of the object recognition model according to the present disclosure.

Referring to FIG. 3, an AI device 20 may include an electronic device including an AI module capable of performing AI processing, or a server including an AI module. In addition, the AI device 20 may be included in the image capturer 100 or the image management server 200 as at least a part thereof to perform at least a part of AI processing together.

The AI processing may include all operations related to a controller of the image capturer 100 or the image management server 200. For example, the image capturer 100 or the image management server 200 may AI-process the obtained image signal to perform processing/determination and control signal generation operations.

The AI device 20 may be a client device that directly uses the AI processing result or a device in a cloud environment that provides the AI processing result to other devices. The AI device 20 may be a computing device capable of learning a neural network, and may be implemented in various electronic devices, such as a server, a desktop PC, a notebook PC, and a tablet PC.

The AI device 20 may include an AI processor 21, a memory 25, and/or a communication unit 27.

Here, the neural network for recognizing data related to image capturer (100) may be designed to simulate the brain structure of human on a computer and may include a plurality of network nodes having weights and simulating the neurons of human neural network. The plurality of network nodes may transmit and receive data in accordance with each connection relationship to simulate the synaptic activity of neurons in which neurons transmit and receive signals through synapses. Here, the neural network may include a deep learning model developed from a neural network model which may be an artificial neural network (ANN) model. In the deep learning model, a plurality of network nodes is positioned in different layers and may transmit and receive data in accordance with a convolution connection relationship. The neural network, for example, includes various deep learning techniques, such as deep neural networks (DNN), convolutional deep neural networks (CNN), recurrent neural networks (RNN), a restricted boltzmann machine (RBM), deep belief networks (DBN), and a deep Q-network, and may be applied to fields, such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 may store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. Of data by the AI processor 21 may be performed. Further, the memory 25 may store a neural network model (e.g., a deep learning model 26) generated through a learning algorithm for data classification/recognition according to the present disclosure.

Meanwhile, the AI processor 21 may include a data learning unit 22 that learns a neural network for data classification/recognition. The data learning unit 22 may learn references about what learning data are used and how to classify and recognize data using the learning data in order to determine data classification/recognition. The data learning unit 22 may learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data learning unit 22 is implemented as a software module (or a program module including instructions), the software module may be stored in non-transitory computer readable media that may be read through a computer. In this case, at least one software module may be provided by an OS (operating system) or may be provided by an application.

The data learning unit 22 may include a learning data acquiring unit 23 and a model learning unit 24.

The learning data acquiring unit 23 may acquire learning data required for a neural network model for classifying and recognizing data.

The model learning unit 24 may perform learning such that a neural network model has a determination reference about how to classify predetermined data, using the acquired learning data. In this case, the model learning unit 24 may train a neural network model through supervised learning that uses at least some of learning data as a determination reference. Alternatively, the model learning unit 24 may train a neural network model through unsupervised learning that finds out a determination reference by performing learning by itself using learning data without supervision. Further, the model learning unit 24 may train a neural network model through reinforcement learning using feedback about whether the result of situation determination according to learning is correct. Further, the model learning unit 24 may train a neural network model using a learning algorithm including error back-propagation or gradient decent.

When the neural network model is trained, the model learning unit 24 may store the trained neural network model in a memory. The model learning unit 24 may store the trained neural network model in the memory of the server connected to the AI device 20 through a wired or wireless network.

The data learning unit 22 may further include a learning data preprocessor (not shown) and a learning data selector (not shown) to improve the analysis result of a recognition model or reduce resources or time for generating a recognition model.

The learning data preprocessor may preprocess acquired data such that the acquired data may be used in learning for situation determination. For example, the learning data preprocessor may process acquired data in a predetermined format such that the model learning unit 24 may use learning data acquired for learning for image recognition.

Further, the learning data selector may select data for learning from the learning data acquired by the learning data acquiring unit 23 or the learning data preprocessed by the preprocessor. The selected learning data may be provided to the model learning unit 24. For example, the learning data selector may select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it may make the model learning unit 24 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator may estimate that a predetermined reference is not satisfied.

The communication unit 27 may transmit the AI processing result of the AI processor 21 to an external electronic device. For example, the external electronic device may include a surveillance camera, a Bluetooth device, an autonomous vehicle, a robot, a drone, an AR (augmented reality) device, a mobile device, a home appliance, and the like. The communication unit 27 may include any one or any combination of a digital modem, a radio frequency (RF) modem, an antenna circuit, a WiFi chip, and related software and/or firmware.

Meanwhile, the AI device 20 shown in FIG. 3 has been functionally divided into the AI processor 21, the memory 25, the communication unit 27, and the like, but the aforementioned components are integrated as one module and it may also be called an AI module.

In the present disclosure, at least one of a surveillance camera, an autonomous vehicle, a user terminal, and a server may be linked to an AI module, a robot, an augmented reality (AR) device, a virtual reality (VR) device, a device related to a 5G service, and the like.

Figure 4:
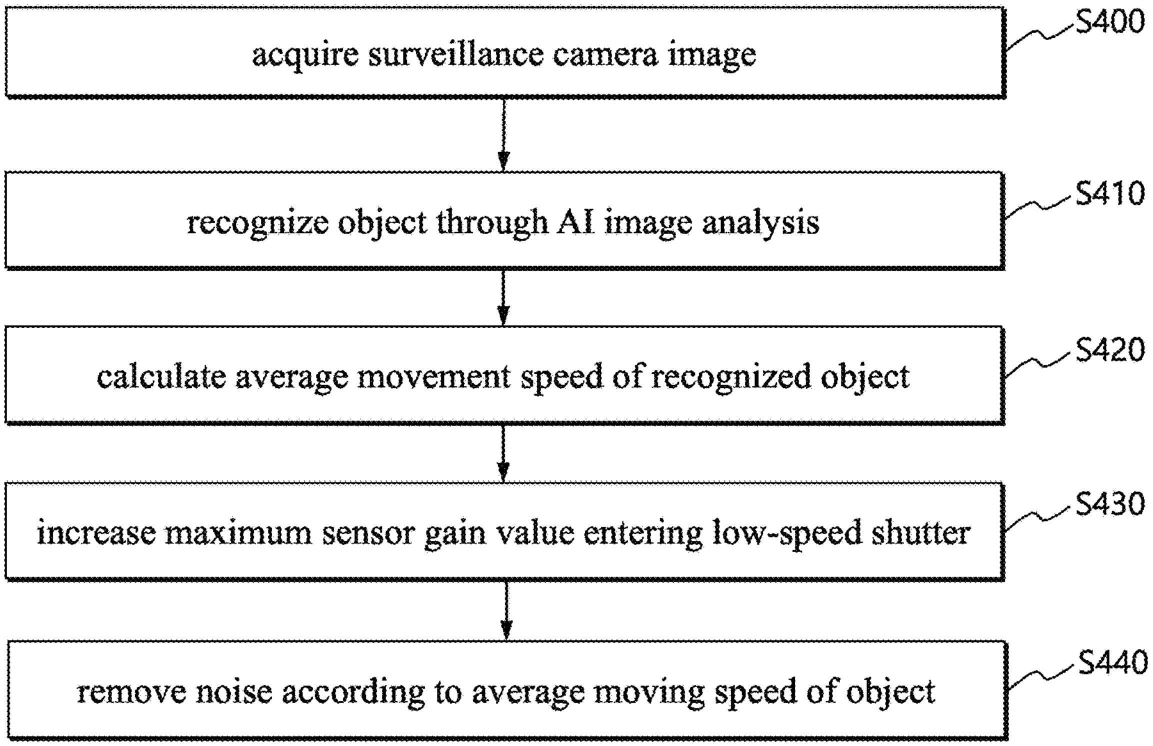
FIG. 4 is a flowchart of a processing method of a surveillance camera image according to the present disclosure.

FIG. 4 is a flowchart of a processing method of a surveillance camera image according to the present disclosure. The image processing method shown in FIG. 4 may be implemented through the surveillance camera system, the surveillance camera device, and the processor or controller included in the surveillance camera device described above with reference to FIGS. 1 to 3. For convenience of description, the image processing method is described on the premise that various functions may be controlled through the processor 260 of the camera 201 shown in FIG. 2, but the present disclosure is not limited thereto.

Referring to FIG. 4, the processor 260 acquires a surveillance camera image (S400). The surveillance camera image may include a video.

The processor 260 may control the acquired image to perform an object recognition operation through an AI image analysis system (S410).

The AI image analysis system may be an image processing module included in a surveillance camera. In this case, the AI processor included in the image processing module may determine recognize an object in an image by applying a predefined object recognition algorithm to an input image (video), thereby determining whether an object exists. In addition, the AI video analysis system may be an image processing module provided on an external server communicatively connected to the surveillance camera. In this case, the processor 260 of the surveillance camera may request object recognition request command and/or a movement degree (a moving speed of the object, an average moving speed information about the object, etc.), while transmitting the input image to the external server through the communication unit. The request may include optimal noise removal intensity information according to the moving speed of the object, and here, the noise removal intensity may include noise removal filter coefficient information used to remove noise from the image of the surveillance camera. That is, according to the present disclosure, the surveillance camera and/or the external server may acquire the noise removal filter coefficient according to the moving speed of the object through image analysis. The noise removal filter coefficient may be obtained through an algorithm applied to noise removal intensity control described throughout this specification.

The processor 260 may calculate an average moving speed of the recognized object (S420). The process of calculating the average moving speed of the recognized object will be described in detail with reference to FIGS. 7 and 8.

The processor 260 may apply a shutter speed corresponding to the calculated average moving speed of the object (S430). Since an afterimage effect becomes severe as the moving speed of the object increases, there is no choice but to increase the shutter speed. Here, the process of applying an optimal shutter speed value to minimize the degree of increasing the shutter speed or minimizing the afterimage effect in a specific moving speed of the object will be described in detail with reference to FIG. 9.

The processor 260 may control noise to be removed by considering the calculated moving speed of the object (S400). As described above, the processor 260 controls the noise removal intensity according to the moving speed of the object.

The image processing method according to the present disclosure may be advantageously applied in a relatively low-illumination environment. Especially, in a high-illumination environment, high-speed shutters are usually used, so afterimage effects due to object movement may not be a major problem. However, in a low-illumination environment, automatic exposure control may be achieved through sensor gain control in a section that is more sensitive to sensor gain than exposure time. Accordingly, in low-illumination environments, noise due to sensor gain control may be problematic. To reduce this noise, maximum brightness should be secured, and ultimately, maintaining a low-speed shutter may be advantageous. However, unlike general cameras, in the case of surveillance cameras, due to the need to clearly recognize objects moving at a high speed even in low-illumination environments, maintaining a high-speed shutter to eliminate the afterimage effect of objects as much as possible may be inevitably considered a priority. Therefore, for surveillance cameras in low-illumination environments, it is most important to determine an optimal shutter value according to brightness and the degree of object movement. In addition, in the surveillance camera in low-illumination environments, in addition to determining the optimal shutter value, there is a need to appropriately lower the noise removal intensity to minimize motion blur.

In the above paragraphs, the rough procedure of recognizing the object in the surveillance camera image, applying the optimal shutter value according to whether the recognized object is moving, the degree of movement of the object (average moving speed of the object), and the presence of the object, and controlling the noise removal intensity according to the degree of object movement has been described.

Hereinafter, object recognition, calculation of the average moving speed of the object, and adjustment of noise removal intensity according to the degree of movement of the object will be described in detail.

Figure 5:
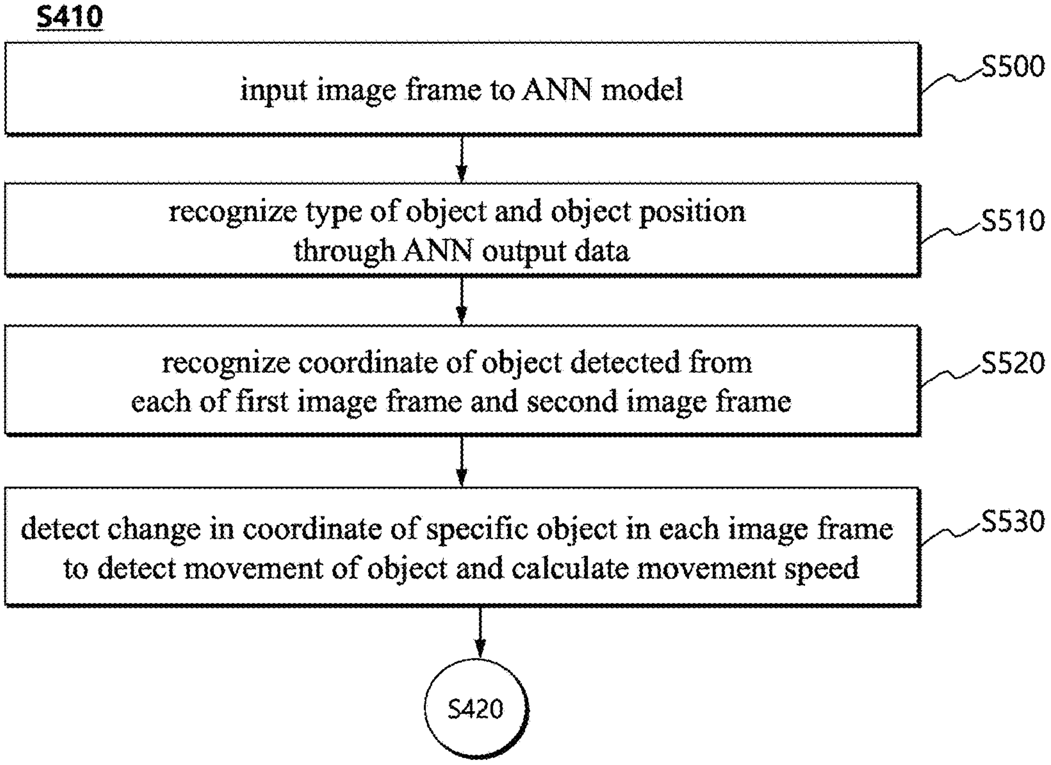
FIG. 5 is a diagram illustrating an example of an object recognition method according to the present disclosure.
Figure 6:
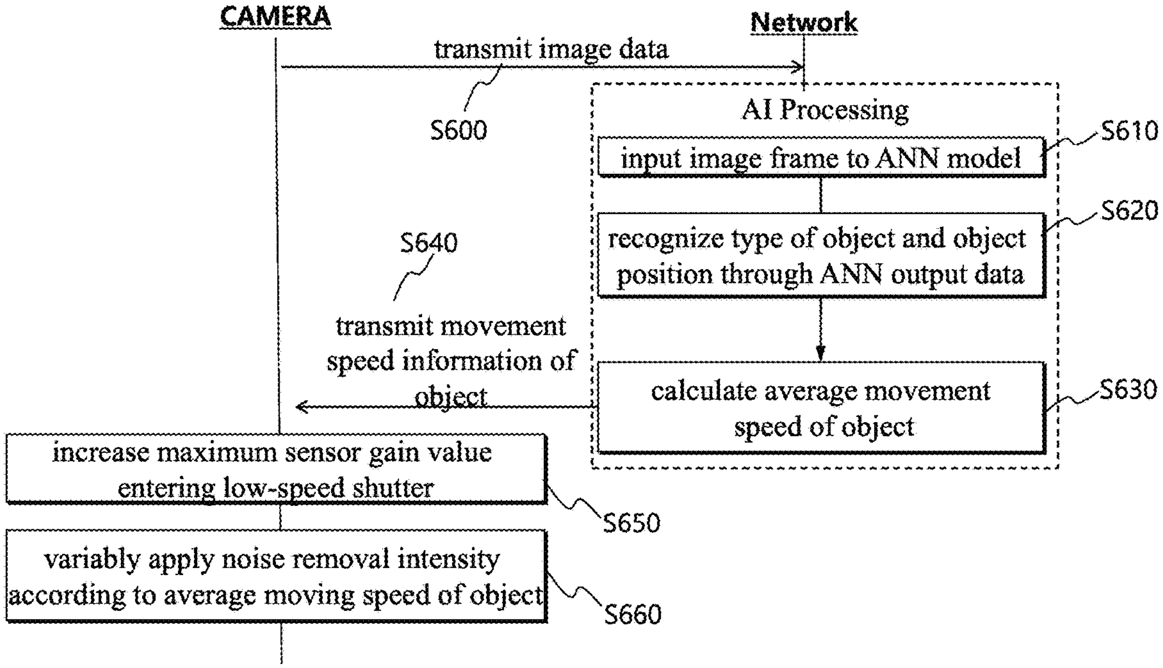
FIG. 6 is a diagram illustrating another example of an object recognition method according to the present disclosure.
Figure 7:
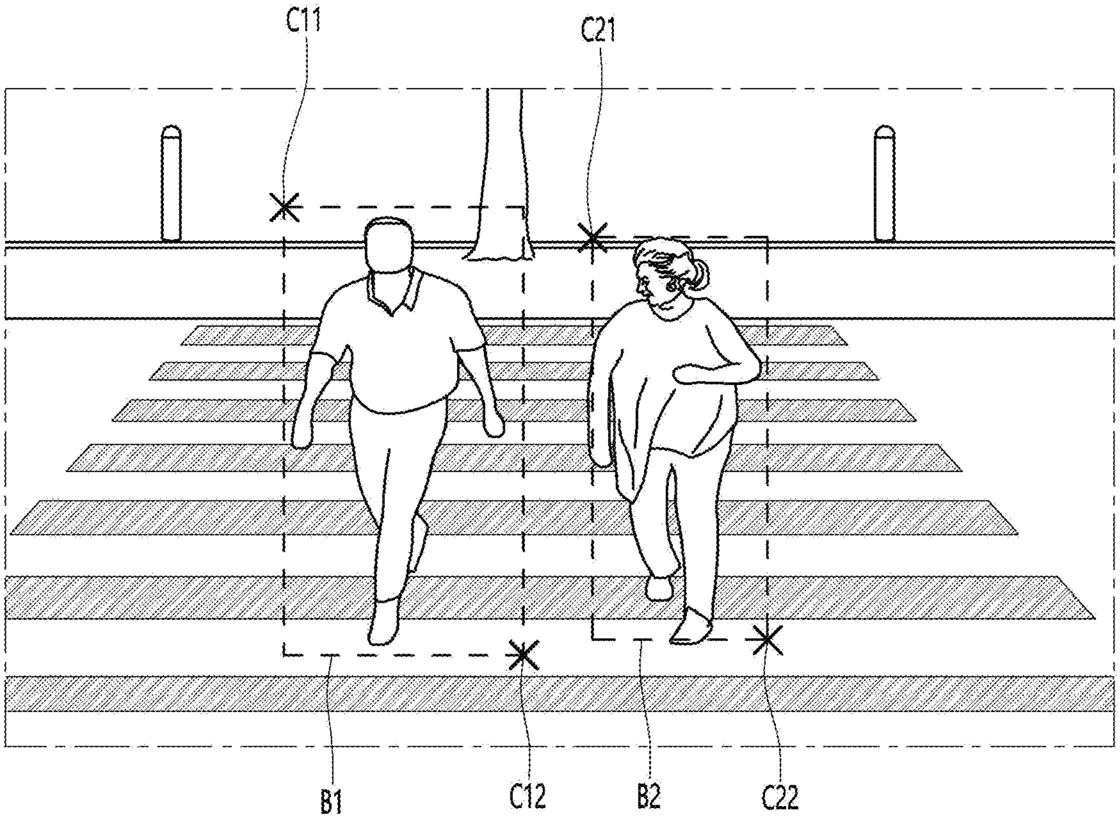
FIG. 7 is a diagram illustrating an object recognition process using an artificial intelligence algorithm according to the present disclosure.
Figure 8A:
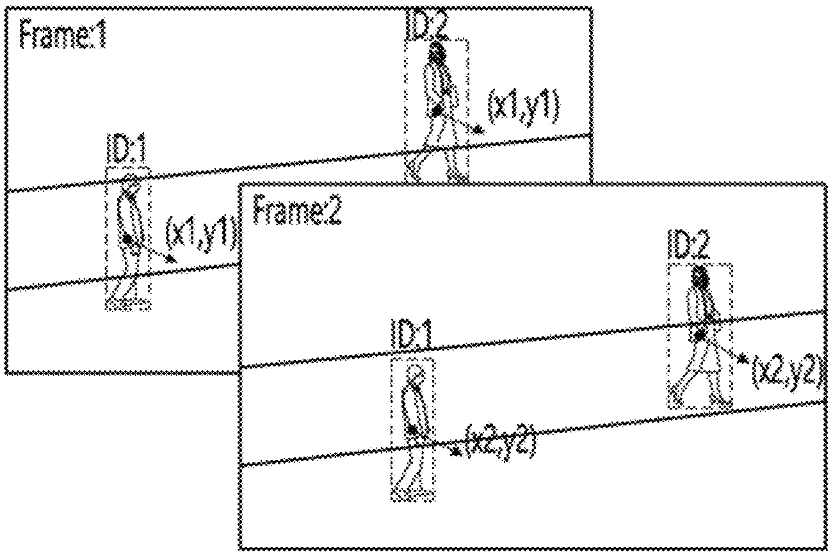
FIGS. 8A and 8B illustrate a process of calculating an average moving speed of a recognized object in FIG. 7.
Figure 8B:
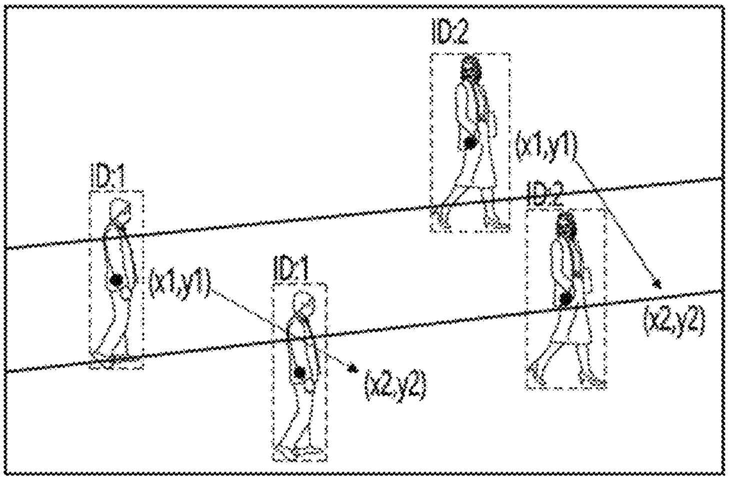

FIG. 5 is a diagram illustrating an example of an object recognition method according to the present disclosure. FIG. 6 is a diagram illustrating another example of an object recognition method according to the present disclosure. FIG. 7 is a diagram illustrating an object recognition process using an artificial intelligence algorithm according to the present disclosure. FIGS. 8A and 8B illustrate a diagram illustrating a process of calculating an average moving speed of a recognized object in FIG. 7. Hereinafter, the process of recognizing objects and calculating an average moving speed of objects using an AI algorithm will be described with reference to FIGS. 5 to 8.

Referring to FIG. 5, which corresponds to the operation S410 shown in FIG. 4, the processor 260 of the surveillance camera inputs an image frame into an artificial neural network model (S500).

The neural network model may be a model trained to use camera images as input data and recognize objects (people, cars, etc.) included in the input image data. As described above, according to the present disclosure, the YOLO algorithm may be applied to the neural network model.

The processor 260 may recognize a type of object and a location of the object through output data of the neural network model (S510). Referring to FIG. 7, an output result of the neural network model and an object recognition result of the neural network model may be displayed in bounding boxes (B1 and B2) and may include coordinate values of the corners C11 and C12/C21 and C22) of each bounding box. The processor 260 may calculate center coordinates of each bounding box through the edge information about the bounding box.

The processor 260 may recognize the coordinates of objects detected in each of first and second image frames (S520). The processor 260 may analyze the first image frame and the second image frame obtained after the first image frame to calculate a movement speed of the object.

The processor 260 may detect a change in the coordinates of a specific object in each image frame, detect movement of the object, and calculate the movement speed (S530).

Meanwhile, FIG. 5 illustrates the process of recognizing an object through AI processing results in a surveillance camera, but FIG. 6 illustrates a case in which the AI processing operation is performed through a network, that is, by utilizing an external server.

Referring to FIG. 6, when a surveillance camera acquires an image, the surveillance camera transmits the acquired image data to a network (including an external server, etc.) (S600). Here, along with transmission of the image data, the surveillance camera may also request information on the presence or absence of an object included in the image and an average moving speed of an object if the object exists.

The external server may check the image frame to be input to the neural network model from the image data received from the surveillance camera through the AI processor, and the AI processor may control the image frame to be applied to the neural network model, which may be an ANN model (S610). In addition, the AI processor included in the external server may recognize the type and location of the object through the output data of the neural network model (S620).

The external server may calculate an average moving speed for the recognized object through the output value of the neural network model (S630). Object recognition and calculation of the average moving speed of the object are as described above.

The surveillance camera may receive object recognition results and/or average moving speed information about the object from an external server (S640).

The surveillance camera controls the shutter speed based on the average moving speed information about the object (S650). Here, the processor 260 may increase a maximum sensor gain value to increase the section in which the high-speed shutter is maintained.

The surveillance camera may dynamically variably apply the noise removal intensity depending on the average moving speed of the object (S660).

Referring to FIG. 8A, when recognizing an object through a neural network model, the processor 260 may display a bounding box on the border of the recognized object and assign an ID to each object. Accordingly, the processor 260 may check an object recognition result through the ID of each recognized object and the center coordinates of the bounding box. The object recognition result may be provided for each of the first and second image frames. Here, in the case of a second image frame, if a new object, rather than the object recognized in the first image frame, which is the previous image, is recognized, a new ID is assigned and the center coordinates of the object may be obtained through the bounding box coordinates.

Referring to FIG. 8B, when the center coordinates of an object obtained from at least two image frames are obtained, the processor 260 may calculate a movement speed of the recognized object based on a change in the center coordinates.

[Equation 1]

$$\text{object speed}_{(ID=1)} = \frac{\sqrt{(X_2 - X_1)^2 + (Y_2 - Y_1)^2}}{\Delta T(\text{시간})}$$

$$\text{object speed}_{(ID=2)} = \frac{\sqrt{(X_2 - X_1)^2 + (Y_2 - Y_1)^2}}{\Delta T(\text{시간})}$$

Here, $(X_1, Y_1)$ are the center coordinates of the first object ID1, and $(X_2, V_2)$ are the center coordinates of the second object ID2.

In addition, the processor 260 may calculate an average movement speed of the object by applying an average filter to the calculated movement speed of each object (refer to formula below).

[Equation 2]

$$\text{average object speed} = \frac{\sum_{k=0}^{n} \text{Object speed}_{ID=k}}{\text{total number of objects}}$$

The processor 260 recognizes objects and calculates the average movement speed of the recognized objects through the aforementioned process for every image frame input from the surveillance camera. The calculated average object speed may be used to adjust the noise removal intensity as will be described in FIGS. 10 to 12.

Meanwhile, the processor 260 checks each sequential image frame, such as a current frame, a previous frame, and a next frame, and deletes the assigned object ID when the recognized object ID disappears from the screen. Accordingly, the total number of objects may also be reduced. Conversely, when an object that did not exist in the previous image frame is newly recognized, the processor 260 assigns a new object ID to the object. The processor 260 includes the object in the calculation of the average moving speed of the object, and increases the total number of objects. If the object ID included in the image frame is 0, the processor 260 determines that there is no object in the acquired image.

Figure 9:
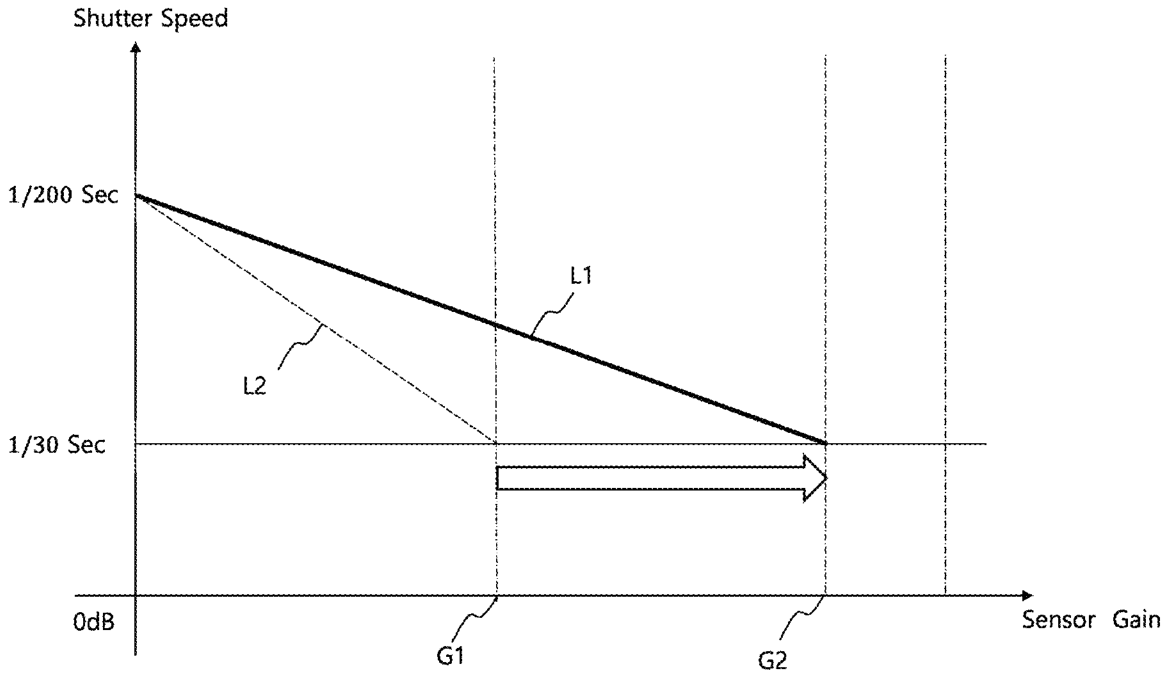
FIG. 9 is a diagram illustrating a change in a shutter speed depending on whether an object is recognized according to the present disclosure.

FIG. 9 is a diagram illustrating a change in shutter speed depending on whether an object is recognized according to the present disclosure.

In the graph of FIG. 9, the X-axis is a sensor gain value, and the Y-axis is a shutter speed value of the surveillance camera. The origin of the X-axis may refer to a shutter speed graph of the surveillance in a low-illumination environment. The shutter of the surveillance camera in the low-illumination environment starts with a high-speed shutter value (generally 1/200 sec) when a sensor gain is 0 dB, and the sensor gain and shutter speed are inversely proportional. In other words, as the illumination decreases, the sensor gain value increases, and the shutter speed gradually progresses to a low-speed shutter to overcome the low-illumination environment. To overcome the low-illumination environment, the sensor gain is gradually increased, but there is a maximum gain value at which the sensor gain may be increased, and a shutter speed corresponding to the maximum gain value is reduced to a low-speed shutter (generally 1/30 sec).

Among the graphs shown in FIG. 9, L1 is a shutter speed curve when an object is recognized in a surveillance camera image, and L2 is a shutter speed curve when an object is not recognized in the surveillance camera image. In this disclosure, the presence of an object is recognized when an object ID is greater than 0 through the aforementioned AI object recognition algorithm, etc., and as shown in FIG. 9, the maximum gain value corresponding to the low-speed shutter speed may be increased from a first maximum gain value G1 to a second maximum gain value G2. In other words, a high-speed shutter (e.g., 1/200 sec) is applied at the beginning of the 0 dB section where the low-illumination environment starts, but as the illumination gradually decreases, the illumination section entering the low-speed shutter (e.g., 1/2 sec) section may be further lowered from G1 to G2, thereby securing a longer high-speed shutter holding time in the low-illumination environment. As a result, the illumination section in which the high-speed shutter value is maintained may increase and noise may increase, but the effect of removing motion blur may be relatively maintained for a longer period of time in the low-illumination section.

This disclosure relates to surveillance camera image processing. Surveillance cameras should take into account the motion of random objects as much as possible in low-illumination environments, so the effect of removing motion blur may be greater than the increase in noise due to a relatively long high-speed shutter holding time.

Figure 10:
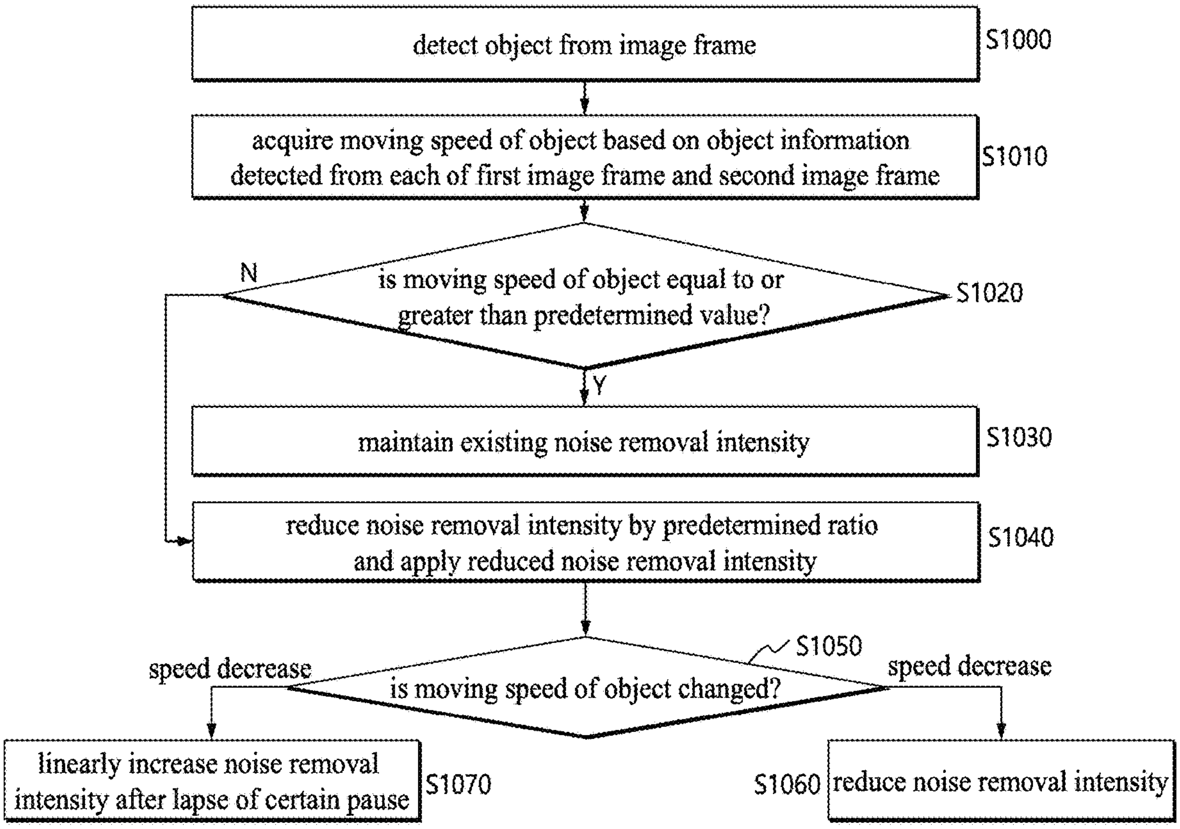
FIG. 10 is a flowchart of a method for processing a surveillance camera image for adjusting a noise removal intensity according to the present disclosure.

FIG. 10 is a flowchart of a method for processing a surveillance camera image for adjusting a noise removal intensity according to the present disclosure.

The noise removal intensity control method may be implemented through a processor (or controller) of a surveillance camera or a processor (or controller) of an image management server. Hereinafter, it is noted that the processor (or controller) that performs each operation may be a module included in a surveillance camera and/or an image management server. For convenience of description, it is described that the noise removal intensity is controlled by the processor of the surveillance camera.

The processor 260 of the surveillance camera may receive an image signal acquired through an image sensor of the surveillance camera and determine whether an object exists in an image frame. The processor 260 may determine the presence of an object using the deep learning object recognition algorithm (e.g., YOLO algorithm) described above (S1000). When an object is recognized, the processor 260 may output a bounding box around the object and output coordinates of vertices of the bounding box. In addition, the controller may calculate the center coordinates within the bounding box of each object.

The processor 260 may acquire a moving speed of the object based on object information detected in each of first and second image frames (S1010). To calculate the moving speed of the object, the processor 260 may sequentially assign an object ID to at least one object detected in the first image frame. The processor 260 may similarly assign an object ID to the second image frame that is input after the first image frame, and output the center coordinates of each object. The processor 260 may calculate the moving speed of each object based on a change (position change) in the center coordinates of the first and second image frames and an acquisition time of the image frame. The processor 260 may calculate an average moving speed of the object by applying an average filter to the calculated moving speed of each object.

The processor 260 may determine whether the moving speed of the object included in the image is greater than or equal to a predetermined value (S1020).

The processor 260 may maintain the existing noise removal intensity when the moving speed of the object included in the image is '0' or less than a predetermined value (S1030). If the moving speed of the object is not 0 but is very slow enough that there is no need to change the noise removal intensity, the noise removal intensity may not be changed.

Meanwhile, when the processor 260 determines that the moving speed of the object included in the image is greater than or equal to a predetermined value, the processor 260 may lower the noise removal intensity by a predetermined ratio (S1040). For example, the noise removal intensity may be reduced by up to 40% compared to a currently set noise removal intensity depending on the moving speed of the object.

Meanwhile, in the present disclosure, when the movement of an object is first detected or when an object moving speed first exceeds a predetermined threshold, the noise removal intensity may be lowered by a predetermined control width, and after the noise removal intensity is reduced, a real-time movement status of the object may be immediately reflected in the noise removal intensity control.

After initially lowering the noise removal intensity based on the appearance and/or movement of the object, the processor 260 may check the moving speed of additional objects in real time. Monitoring the moving speed of the object in real time may be confirmed through the AI object detection algorithm described above. When it is determined that the moving speed of the object is additionally increased as a result of additionally checking whether the moving speed of the object has changed (S1050: speed increase), the processor 260 may immediately control to reduce the noise removal intensity by a control ratio corresponding to the speed increase ratio (S1060). If the processor 260 determines that the moving speed of the object is reduced compared to the previously measured speed (S1050: speed decrease), the processor 260 may control to increase the noise removal intensity by the control ratio corresponding to the speed decrease ratio but control to linearly increase by a linearly final target intensity after a pause time in which the current intensity of the noise removal filter is maintained for a certain period of time to minimize a malfunction due to an error of object recognition (S1070).

Accordingly, the present disclosure dynamically changes the noise removal intensity as the moving speed of the object changes in real time even after the noise removal intensity decreases due to the first appearance of the object and/or an increase in moving speed, but controls the noise removal intensity depending on whether the speed increases or decreases, thereby minimizing an error of object recognition due to changes in noise removal intensity.

Hereinafter, the noise removal intensity control method described in FIG. 10 will be described in more detail with reference to FIGS. 11 and 12.

Figure 11:
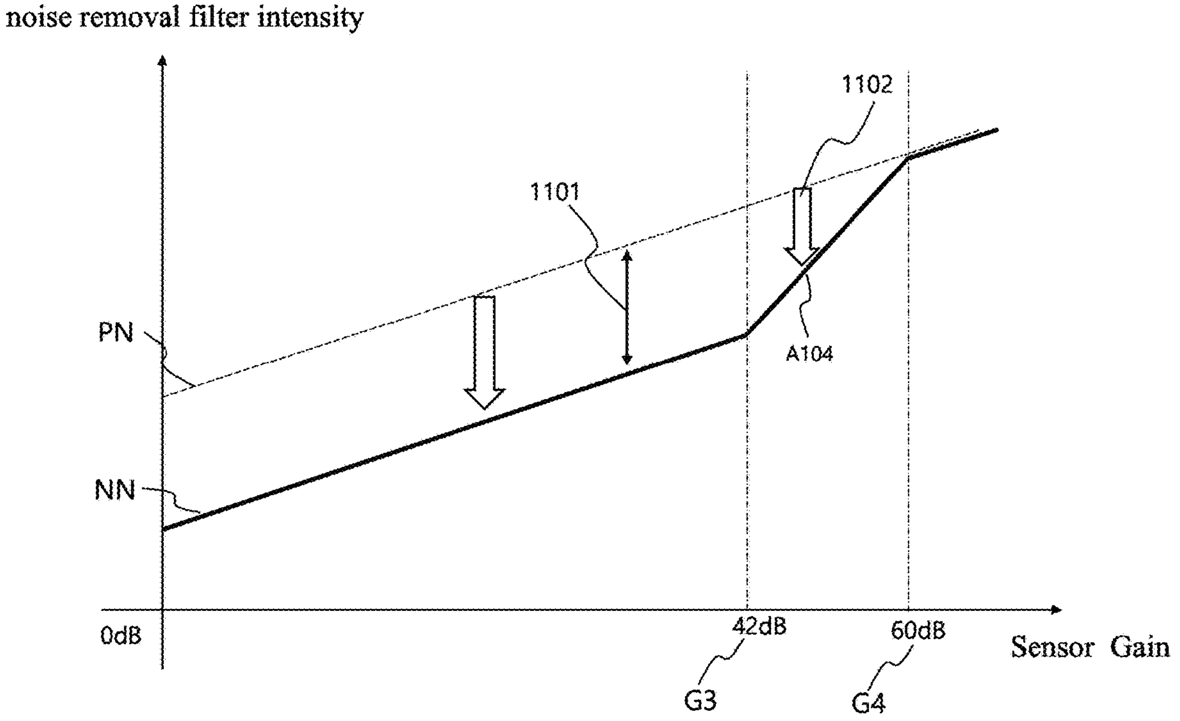
FIG. 11 is a diagram illustrating a change in noise removal intensity depending on whether an object is recognized according to the present disclosure.

FIG. 11 is a diagram illustrating a change in noise removal intensity depending on whether an object is recognized according to the present disclosure.

According to the present disclosure, factors that determine the noise removal intensity of a surveillance camera image may be a sensor gain value and a moving speed of an object recognized in the image. Referring to FIG. 11, when there is no object in the surveillance camera image, the noise removal intensity may be controlled according to a first noise removal intensity control curve (PN). Here, the first noise removal intensity control curve may be a case where a fixed filter coefficient is applied regardless of the presence or absence of an object.

Meanwhile, when an object exists in the surveillance camera image and there is a change (increase, decrease, etc.) in the moving speed of the object, the processor 260 may control the noise removal intensity according to a second noise removal intensity control curve (NN). Here, since a filter coefficient of the second noise removal intensity control curve NN varies depending on the moving speed of the object, the noise removal intensity may be dynamically varied in the graph of FIG. 11 (reference number 1101). Here, the lowest value of the second noise removal intensity control curve (NN) may be 60% of the first noise removal intensity control curve (PN), and as an average moving speed of the object changes, the intensity may change in the range of reference number 1101. In other words, if the object moves quickly, the existing intensity is reduced by up to 40% to eliminate motion blur in the image.

However, even in a low-illumination environment, if the sensor gain value should be set to a certain level or higher, it may be difficult to identify an object due to additional noise generated due to sensor signal amplification. In this case, it is necessary to additionally control the noise removal intensity. According to the present disclosure, when the sensor gain amplification amount is gradually increased and reaches a first gain value G3 (for example, in an environment where a sensor gain of 42 dB or more should be used), the processor 260 may restore the intensity of the noise filter to the same level as the existing intensity and apply the noise removal filter with the same intensity as the first noise removal intensity control curve (PN) at the point of using a second gain value G4 (for example, 60 dB). That is, if an object is not recognized in the image in an environment where the gain value is G3 or lower, the first noise removal intensity control curve PN is followed, and if movement of the object is detected in the image acquired in the section where the gain value is between G3 and G4, the processor 260 may reduce the noise removal intensity according to a reduction amount smaller than a maximum of 40% (for example, reference numeral 1102).

Figure 12:
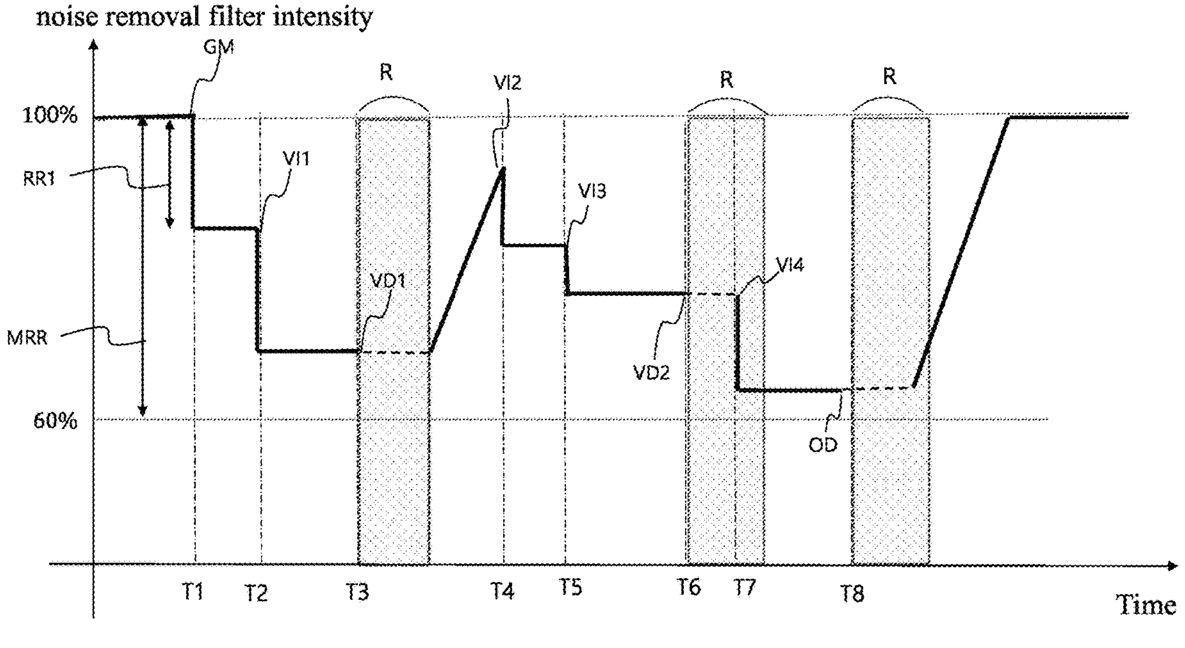
FIG. 12 is a diagram illustrating a change in noise removal intensity according to a moving speed of an object according to the present disclosure.

FIG. 12 is a diagram illustrating a change in noise removal intensity according to a moving speed of an object according to the present disclosure.

The 3D noise filter (3DNR) may dynamically change depending on a speed of an object. As the speed of the object increases, the intensity of the noise filter decreases to acquire an image without a drag of the dynamic object. When the speed of the object decreases, the intensity of the noise filter may increase to acquire a clear image. Meanwhile, a 2D noise filter (2DNR) filter that does not affect image acquisition of the dynamic object may perform noise control according to the first noise removal intensity control curve (NN) described in FIG. 11 regardless of the movement of the object.

Referring to FIG. 12, when movement of an object occurs at time T1 (GM), the processor 260 immediately reduces the intensity of the noise filter. At this time, the reduction amount (RR1) of the noise filter intensity may increase linearly in proportion to the speed of the object. If the moving speed of the object is maintained in the T1 to T2 section, the noise filter intensity may be maintained.

When the moving speed of the object increases at time T2 (VI1), the processor 260 may additionally lower the intensity of the noise filter. As described above, the maximum reduction amount (MRR) of the noise filter may be at the level of 40% of the noise filter intensity in the absence of an object.

When the moving speed of the object decreases or the movement of the object disappears at time T3, the processor 260 does not immediately increase the intensity of the noise filter, unlike in the case of an increase in moving speed. When the moving speed of an object decreases (VD1), the processor 260 may linearly increase the noise removal intensity according to the progress of the decreased moving speed after a certain period of pause time R. The pause time may be a time to minimize malfunction due to an object recognition error of the surveillance camera itself. During the pause time, the noise removal intensity applied before the moving speed of the object is changed may be continued.

When the moving speed of the object increases again (VI2, VI3) at times T4 and T5, the processor 260 may reduce the noise removal intensity according to the reduction amount determined according to the change in the moving speed of each object.

There may be a case in which the noise filter intensity applied before the speed of the object changes continues during the aforementioned pause time R, but the moving speed of the object changes during the pause time R. For example, after the processor 260 detects a decrease in the moving speed of the object VD2 at time T6, the processor 260 may detect that the moving speed of the object increases during the pause time R although the certain period of pause time R is applied (VI4). In this case, the processor 260 may immediately reduce the noise removal intensity according to the moving speed of the object despite the pause time R.

When the processor 260 recognizes that an object has disappeared from the surveillance camera image (OD), the processor may linearly restore the intensity of the noise removal filter after a certain period of pause time R has elapsed.

Figure 13A:
FIG. 13A illustrates an image obtained by applying a fixed noise removal intensity regardless of the presence or absence of an object.
Figure 13B:
FIG. 13B illustrates an image to which a dynamic change algorithm in noise removal intensity according to results of AI automatic object recognition is applied, according the present disclosure.

FIGS. 13A and 13B illustrates a comparison between an image obtained by applying a fixed noise removal intensity regardless of the presence or absence of an object (FIG. 13A), and an image to which a dynamic change algorithm in noise removal intensity according to the result of AI automatic object recognition is applied (FIG. 13B), according to the present disclosure. The image shown in FIG. 13B has relatively less motion blur than the image shown in FIG. 13A and may be a clearer image due to minimized noise.

In the above, the method of processing a surveillance camera image capable of minimizing noise and motion blur effects by dynamically variably controlling the noise removal intensity according to the presence or absence of an object and the moving speed of the object through artificial intelligence-based object recognition has been described. Although the present disclosure is described that an AI-based object recognition algorithm is applied, artificial intelligence may also be applied in the process of calculating a reduction amount of a noise filter intensity according to the average moving speed value of the recognized object. A control width of the noise removal intensity according to the average moving speed of the aforementioned object has a maximum reduction of 40%, and when the low-illumination environment becomes more severe, a learning model may be trained so that a control width of the noise removal intensity is differently applied (a reduction less than 40% is applied) based on a predetermined threshold (e.g., 42 dB, 60 dB) in generating the learning model. When the moving speed and illumination value of an object are input as input data, the learning model may automatically calculate the amount of noise filter reduction according to the moving speed and may minimize noise and motion blur according to low-illumination conditions.

At least one of the components, elements, modules, units, or the like (collectively "components" in this paragraph) represented by a block or an equivalent indication (collectively "block") described above, for example, device, processor, logic, controller, circuit, generator, detector, encoder, decoder, operator, latch, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein). These components may, for example, be embodied in one or more semiconductor chips, or on substrate supports such as printed circuit boards and the like. These circuits may also be implemented by dedicated hardware, or by a processor (e.g., one or more programmed microprocessors and associated circuitry), or by a combination of dedicated hardware to perform some functions of the block and a processor to perform other functions of the block. Each block may be physically separated into two or more interacting and discrete blocks. Likewise, the blocks may be physically combined into more complex blocks.

The present disclosure described above may be implemented as a computer-readable code in a medium in which a program is recorded. The computer-readable medium includes any type of recording device in which data that may be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present disclosure should be determined by reasonable interpretations of the attached claims and every modification within the equivalent range are included in the scope of the present disclosure.

The above examples may be applied to service provision fields using surveillance video cameras, surveillance video camera systems, and surveillance video cameras, etc.

What is claimed is:

1. A device for processing a camera image, the device comprising:

an image capturer configured to obtain an image; and a processor configured to control a first noise removal intensity according to an amount of sensor gain amplification in the image in a low-illumination environment, wherein, based on recognizing an object in the image by machine learning algorithm, the processor is configured to dynamically control a noise removal intensity from the first noise removal intensity to a second noise removal intensity according to a movement of the object.

2. The device of claim 1, wherein the second noise removal intensity is lower than the first noise removal intensity.

3. The device of claim 1, wherein the processor is configured to apply the first noise removal intensity where the object or the movement of the object is not detected in the image.

4. The device of claim 1, wherein the processor is configured to decrease the first noise removal intensity as the speed of the object increase.

5. The device of claim 1, wherein the processor is configured to increase the first noise removal intensity as the speed of the object decrease.

6. The device of claim 1, wherein the processor is configured to linearly control the first noise intensity and the second noise intensity according to an amount of sensor gain amplification.

7. A device for processing a camera image in a low-illumination environment, the device comprising:

an image capturer configured to obtain an image; and a processor configured to:

recognize an object in the image based on machine learning algorithm, detect a movement degree of the object in the image, dynamically control at least one parameter related to noise removal based on the detected movement degree of the object in the low-illumination environment.

8. The device of claim 7, wherein the at least one parameter includes a first noise removal intensity that is applied as the recognition of the object in the image does not occur.

9. The device of claim 8, wherein the processor is configured to reduce the noise removal intensity as the movement degree of the object increases.

10. The device of claim 8, wherein the processor is configured to increase the noise removal intensity as the movement degree of the object decreases.

11. The device of claim 7, wherein the processor is configured to linearly adjust at least one parameter according to an amount of sensor gain amplification.

12. The device of claim 7, wherein the at least one parameter is adjusted based on a noise removal control curve corresponding to an amount of sensor gain amplification and the movement degree of the object.

13. The device of claim 7, wherein the movement degree of the object comprises at least one of a moving speed of the object.

14. The device of claim 7, wherein the movement degree of the object is detected based on a deep learning-based You Only Look Once (YOLO) algorithm.

15. A method for processing a camera image, the method comprising:

controlling a first noise removal intensity according to an amount of sensor gain amplification in the image in a low-illumination environment, based on an object in the image being recognized by machine learning algorithm, recognizing a movement of the object dynamically controlling a noise removal intensity from the first noise removal intensity to a second noise removal intensity according to the movement of the object.

16. The method of claim 15, wherein the second noise removal intensity is lower than the first noise removal intensity.

17. The method of claim 15, as the object or movement of the object is not detected in the image, the first noise removal intensity is applied.

18. The method of claim 15, as the speed of the object increase, the first noise removal intensity is decreased.

19. The method of claim 15, as the speed of the object decrease, the first noise removal intensity is increased.

20. The method of claim 15, wherein the first noise intensity and the second noise intensity according to an amount of sensor gain amplification are linearly controlled.

* * * * *